Figure 3A:
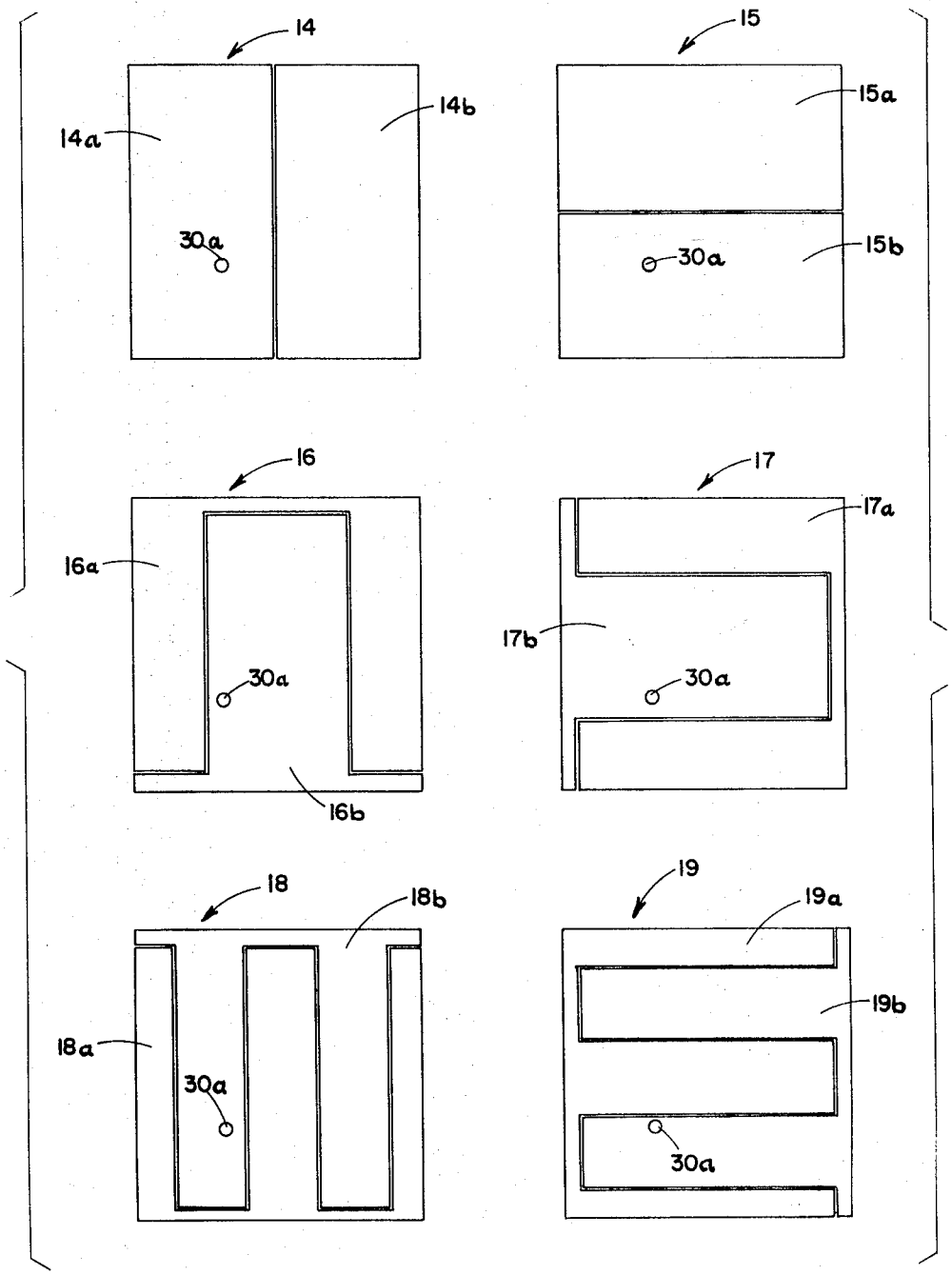

United States Patent

[11] 3,602,903

[72] Inventor Stanley C. Requa
 Northridge, Calif.
[21] Appl. No. 789,285
[22] Filed Jan. 6, 1969
[45] Patented Aug. 31, 1971
[73] Assignee Northrop Corporation
 Beverly Hills, Calif.

[54] OPTICAL SENSING SYSTEM FOR DETECTING AND STORING THE POSITION OF A POINT SOURCE TARGET
9 Claims, 7 Drawing Figs.

[52] U.S. Cl. .................................................. 340/173,
 350/172
[51] Int. Cl. .................................................. G11c 11/42
[50] Field of Search .......................................... 350/319;
 356/4, 152, 156, 172; 340/173 LM; 250/216, 217

[56] References Cited
UNITED STATES PATENTS
2,081,936 6/1937 Keenan ........................... 356/172

3,439,348 4/1969 Harris ........................... 340/173
3,480,919 11/1969 Jensen ........................... 340/173
3,488,636 1/1970 Dyck ........................... 340/173

Primary Examiner—Terrell W. Fears
Attorney—Sokolski & Wohlgemuth

ABSTRACT: The position of a point source target in a field of view is simultaneously focused onto a plurality of sensing units by means of a multifaceted lens. Each of the sensing units has a photosensitive area which is divided into a pair of equal area sensing elements which are arranged in either horizontal or vertical finger patterns. The finger patterns are arranged in a binary coded fashion and at any particular time one or the other of the elements of each unit generates an output in response to the optical target, the combination of such outputs being indicative of the position of the target. The output of the optical sensing units are fed to digital registers which develop a binary coded signal indicative of the target position for utilization in a readout device.

PATENTED AUG 31 1971
SHEET 1 OF 4
3,602,903
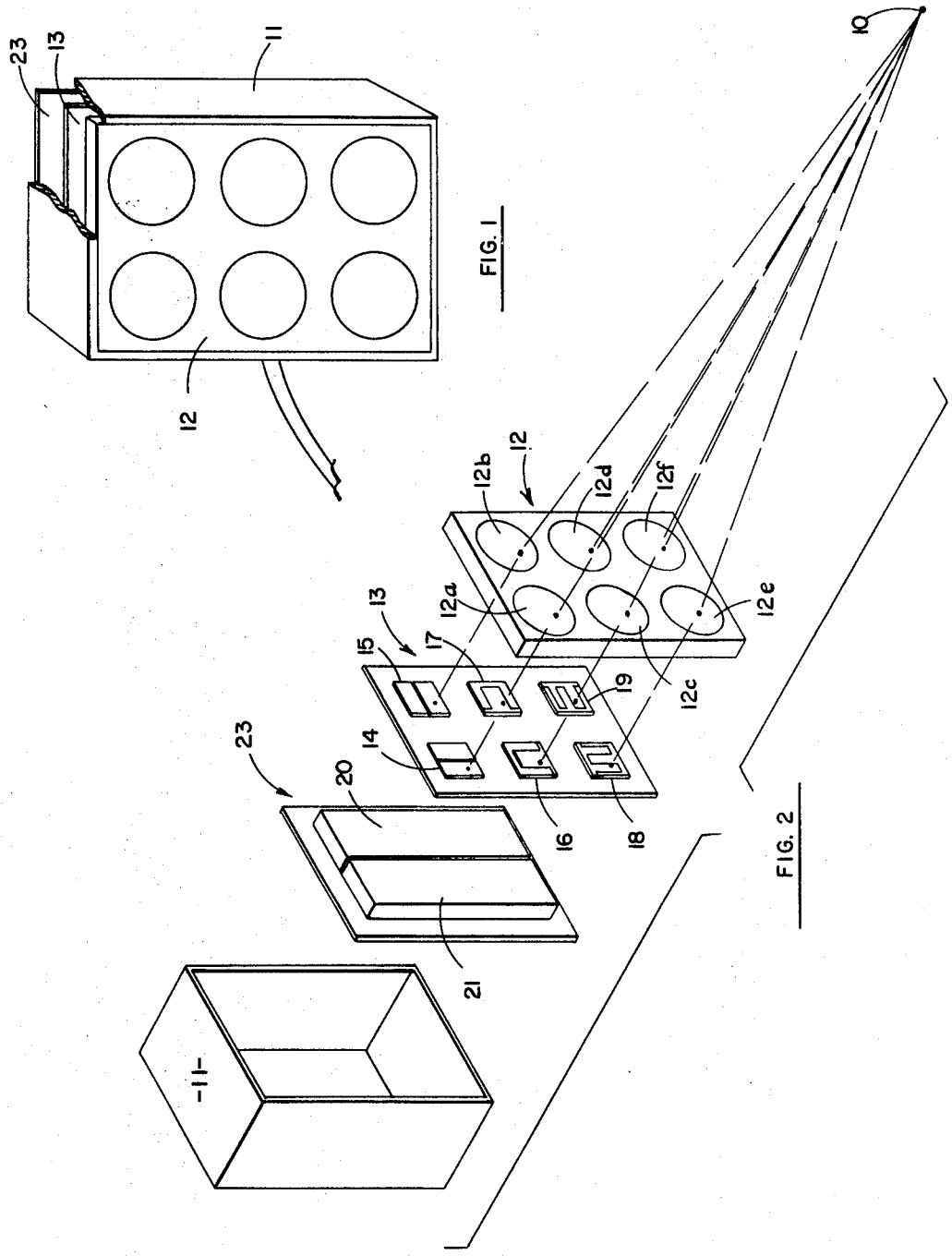
INVENTOR.
STANLEY C. REQUA
BY
SOKOLSKI & WOHLGEMUTH

INVENTOR.
STANLEY C. REQUA

BY SOKOLSKI & WOHLGEMUTH

ATTORNEYS

OPTICAL SENSING SYSTEM FOR DETECTING AND STORING THE POSITION OF A POINT SOURCE TARGET

This invention relates to optical target sensors, and more particularly to such a device for detecting a point source target and generating a digital signal in accordance with the position of such target.

Passive point source optical target detection techniques are utilized for such applications as star detection in navigation systems and infrared detection in fire control systems. Active target detection systems utilizing a laser beam to illuminate the target also involve point source detection.

Point source detection systems of the prior art generally involve analog implementations whereby the optical sensor is first slewed into position where it is close to alignment with the target and at which nearly aligned position it is capable of developing a control signal which operates a servo loop to lock the sensor onto the target and maintain it in such "lock-on" position. While the analog control signal is fully capable of accurately operating a servo loop, it generally is not precisely proportional to the deviation of the target from the sensor bore axis at all times due to inherent nonlinearities involved in many analog implementations. Further, such target acquisition systems of the prior art are generally not capable of producing a signal indicative of the target position over any but a narrow field of view. Further, many systems presently utilized for navigation and fire control applications, with which target acquisition of the contemplated types are involved, utilize digital implementations and thus have a certain degree of incompatibility with the aforementioned analog implementations.

The system of this invention overcomes the above indicated shortcomings of the prior art by providing a point source optical target detector which directly generates a digital readout which is in accordance with the position of the target in an optical field of view. Continual digital readout is provided indicating precisely where the target is within such field of view, such precision being achieved by virtue of a position matrix defined by the sensors. The precision is limited only by the resolution of the matrix and not by nonlinearity factors as encountered in analog systems. This end result is achieved without the utilization of a scanner device and can be implemented either in a passive or an active detection system.

It is therefore the principal object of this invention to provide an improved optical point source target sensor which provides a digital output in accordance with the position of the target in a field of view.

Figure 3B:
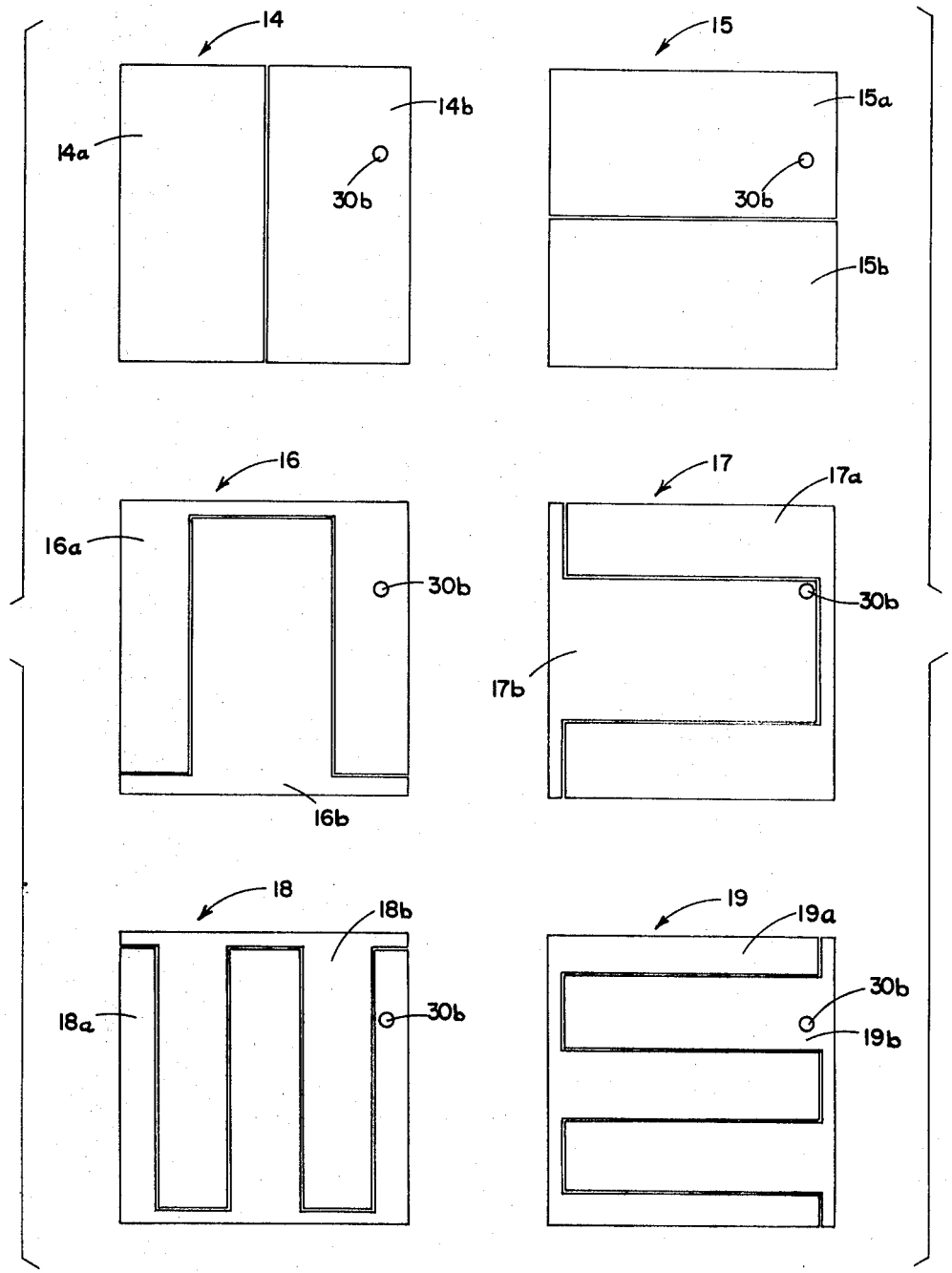
Figure 5:
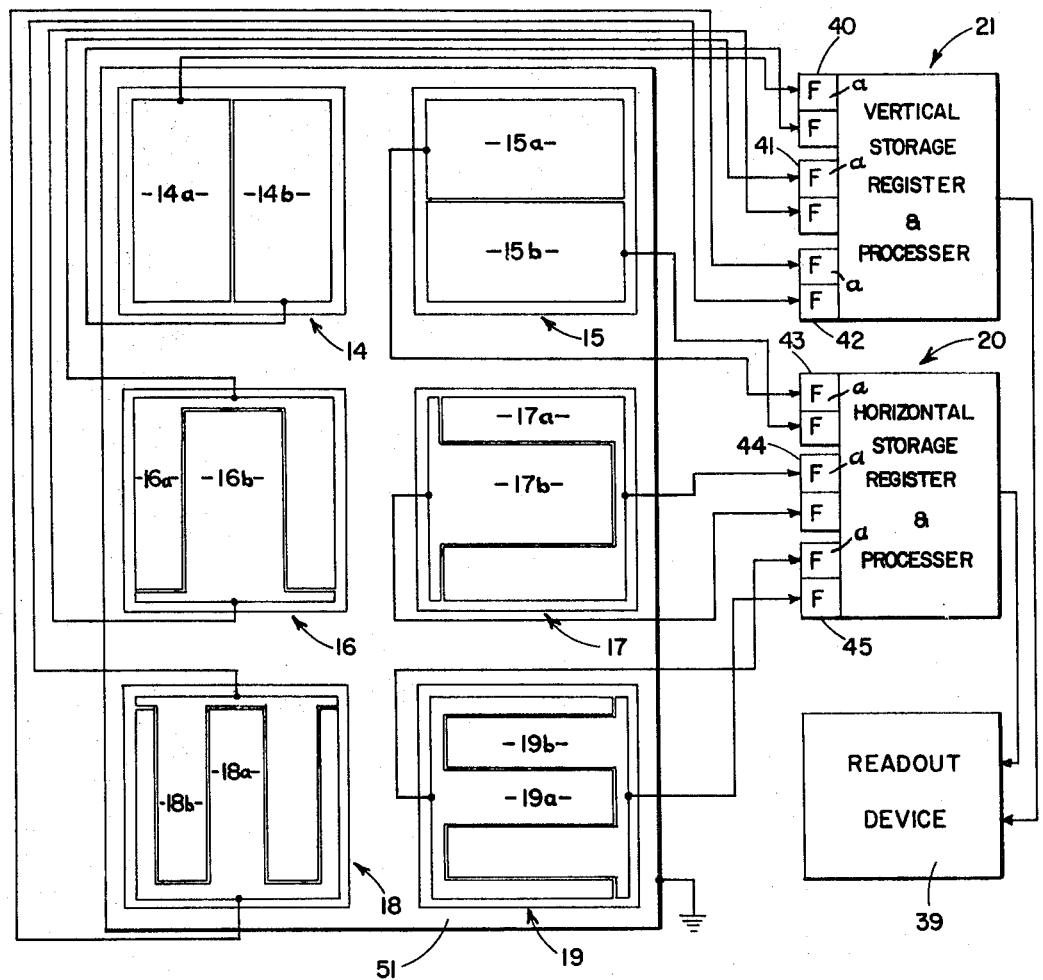
Figure 6:
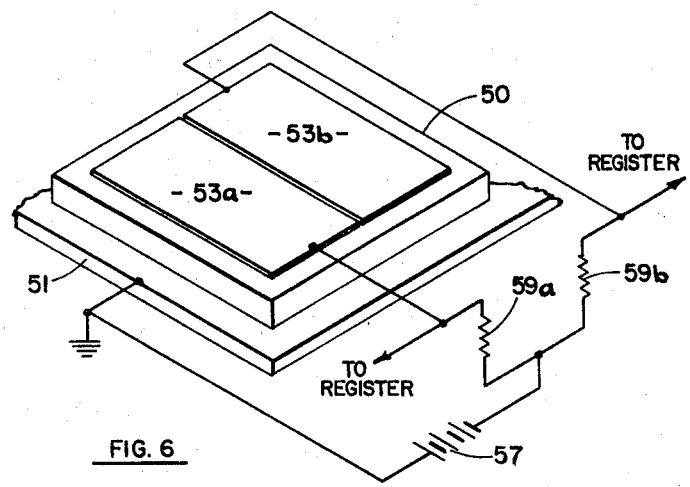
Figure 4:
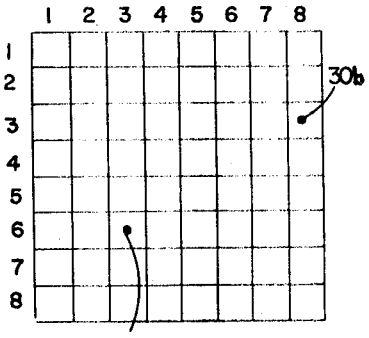

The invention will now be described in connection with the drawings, of which:

FIG. 1 is a perspective view illustrating one embodiment of the invention in its assembled form, FIG. 2 is an exploded view of the embodiment of FIG. 1, FIGS. 3a and 3b are schematic views illustrating sensor units of a preferred embodiment of the invention, FIG. 4 is a schematic view illustrating typical targets within a position matrix of the field of view of the embodiment of FIG. 1, FIG. 5 is a schematic view illustrating the interconnections between the sensor units and storage registers of the embodiment of FIG. 1, and FIG. 6 is a schematic view illustrating the development of a readout signal from a sensor which may be used in the device of the invention.

Briefly described, the device of the invention comprises a multifaceted lens which focuses an image of a point source target onto a plurality of optical sensor units. Each sensor unit has a flat photosensitive area which is divided equally between a pair of sensor elements. The sensor elements are arranged in binary coded finger patterns. The outputs of each pair of sensor elements are fed to the storage elements of a digital storage register, each such storage element being actuated in accordance with the binary optical excitation of the associated sensor unit. Thus, the storage register has a binary coded signal therein which is indicative of the position of the target in the matrix of the field of view, this binary coded signal being fed to a readout device.

Referring now to FIGS. 1 and 2, one embodiment of the device of the invention is perspectively illustrated. Mounted in casing 11 is a multifaceted or "fly-eye" lens 12 which focuses an image of target 10 on each of the sensor units 14–19 of sensor 13. Thus, lens elements 12a–12f simultaneously focus images of target 14 at corresponding positions on sensor units 14–19 respectively.

As to be explained more fully further on in the specification, sensor units 14–19 each comprises a pair of photosensitive elements which are divided in binary fashion so that each sensor element covers half of the area of its associated unit. Sensor units 14, 16 and 18 have their elements arranged in vertical finger patterns, while sensor units 15, 17 and 19 have sensor elements arranged in horizontal finger patterns. The outputs of sensor units 14, 16 and 18 are each fed to a separate storage unit of storage register 21 which is mounted on board 23 while the outputs of sensor units 15, 17 and 19 are each fed to register units of a similar storage register 20 mounted on board 23.

Referring now to FIGS. 3a, 3b and 4, the operation of the invention will now be described. Sensor units 14–19 are each divided into equal photosensitive sensing elements 14a, 14b–19a, 19b respectively. The photosensitive areas, as to be explained fully further on in the specification, may be formed by silicon wafers. It is to be noted that the elements of each unit are separated from each other so that they are capable of forming independent electrical current paths. The sensor elements 14a–19a and 14b–19b are arranged in binary coded finger patterns, the elements of sensor units 14, 16 and 18 being oriented in a first direction which may be vertical, while the elements of sensor units 15, 17 and 19 are oriented normal to those of units 14, 16 and 18 in a direction which may be horizontal. The resolution obtainable with six sensor units as shown in the illustrative embodiment is as defined by an 8×8 position matrix, as shown in FIG. 4. That is to say, each of the matrix squares represents the definition or resolution capability of the system in sensing a target. It is to be noted that the particular six-unit sensor system shown is only illustrative and a higher resolution system can readily be constructed utilizing the same principles as described herein but with additional sensor units. The matrix resolution obtainable with any particular number of binary sensor units of the type described can be determined by raising 2 to a power which is equal to the number of sensor units divided by 2. Thus, for example, the resolution of a 16×16 matrix can be obtained with 8 sensor units and a 128×128 resolution matrix with 14 sensor units. Thus, it can be seen that very high resolution can be obtained with a relatively small number of sensor units.

Referring now to FIGS. 3a and 4, the sensing of a target signal 30a which appears at the matrix position 3,6 in the field of view is shown. As shown in FIGS. 2 and 3a, target signal 30a is focused by the multifaceted lens 12 onto sensor elements 14a, 16b, 18b, 15b, 17b, and 19b. As to be explained more fully in connection with FIG. 5, the optical signal 30a causes the sensing element on which it impinges to generate a signal to an associated register unit, thus providing a binary coded signal uniquely representing the matrix position 3,6.

Referring now to FIGS. 3b and 4, a second example, i.e., for a target signal 30b in position 8,3 in the matrix is shown. It is to be noted that only a single point source target can be read at a time, and target signals 30a and 30b could not be read out of the system simultaneously. As shown in FIG. 3b, the target 30b energizes sensor units 14b, 16a, 18a, 15a, 17b, and 19b, to provide a unique digital output for readout from a digital storage register which defines the position of target 30b on the matrix at 8,3.

Referring now to FIG. 5, the sensor elements of vertical sensor units 14, 16 and 18 are each fed to a separate flip-flop storage unit 40–42 respectively of vertical storage register and processor 21. The "a" sensing element of each pair is fed to one of the flip-flop stages of each flip-flop unit, while the "b" sensing element is fed to the other flip-flop stage of this same unit. Thus, each flip-flop unit is set in one or the other of its binary conditions, depending upon which of the sensing elements of the pair is activated at any time.

Similarly, the sensing elements of horizontal sensor units 15, 17, and 19 are fed to flip-flop storage units 43, 44 and 45 respectively of horizontal storage register and processor 20, such flip-flop units being actuated in the same manner as just described for the vertical units.

It thus can be seen that the flip-flop storage units 40–45 will be actuated in binary form in accordance with the actuation of the pairs of sensing elements.

Listing the condition of the "a" sensing unit first, and assuming the actuation of the flip-flop stages labeled "a" in FIG. 5 to represent a TRUE condition, the following is the truth table for targets 30a and 30b, as indicated on the matrix of FIG. 4 for each of the sensing units:

| Matrix Position | Sensor Units 14 16 18 15 17 19 | Register Units |
| --- | --- | --- |
| 30a | 10 01 01 01 01 01 | 40,$\overline{41}$,$\overline{42}$,43,$\overline{44}$,$\overline{45}$ |
| 30b | 01 10 10 10 01 01 | $\overline{40}$,41,42,43,$\overline{44}$,$\overline{45}$ |

The vertical and horizontal storage registers 20 and 21 are actuated as indicated in the above table, and the unique binary coded signals for each position on the matrix are appropriately processed and fed to readout device 39 for utilization in either tracking the target, providing display information therefor, or for other application requirements.

Referring now additionally to FIG. 6, the construction of a sensor unit which may be utilized in the device of the invention is illustrated. The particular device illustrated in FIG. 6 is a reverse bias Schottky barrier photodiode and is one of several types of devices that may be utilized for the sensor units.

The sensor units comprise an N-type of silicon wafer which is attached to a metallic backing 51 as, for example, by alloying. A single common backing plate 51 may be utilized for all of the sensing units, as shown in FIG. 5, and provides a common connection therebetween. Plate 51 may be of a highly conductive material such as copper. Finger pattern sensor elements are delineated by semitransparent gold layers 53a and 53b which are vacuum deposited on silicon wafers 50. The gold conductors 53a and 53b are separated from each other and deposited in the forms indicated in FIG. 5 to provide the finger pattern sensing elements 14a–19a and 14b–19b. The sensing elements formed by the vacuum deposited finger patterns, the silicon wafers and the conductive backing are reverse biased by means of direct current power source 57.

When a beam of light is focused on a portion of the surface of a silicon wafer 50 through the semitransparent gold layer 53a or 53b thereabove, a current will flow from the surface of the wafer to the gold layer portion 53a or 53b immediately overlaying it, such current flowing through an associated one of resistors 59a or 59b as the case may be, thereby providing output signals to the register in accordance with the portions of the sensing units that have received light excitation. Thus, for example, if a light beam is focused onto wafer 50 in the area covered by gold layer 53a, a current will be caused to flow through resistor 59a, providing a "1" output to the appropriate register unit, the other gold overlay section 53b having no significant current flow through resistor 59b. Conversely, a spot of light on the area of the wafer by layer 53b will result in a "0" output to the register.

It is to be noted that this is but one of several fabrication techniques that can be used for the photoconductive sensors. Photosensitive devices produced by thin film or diffusion techniques may also be utilized.

The device of this invention thus provides means for providing continuous information in digital form as to the position of a point source optical target.

I claim:

1. A system for generating a digital readout signal in accordance with the position of an optical point source target, comprising:
   a plurality of sensor units, each of said sensor units comprising a pair of light sensitive sensor elements arranged in binary coded finger patterns,
   multifaceted lens means for simultaneously focusing an image of the point source target on one or the other of the sensor elements of each of said sensor units, and
   digital storage register means for receiving the outputs of said sensor units and developing a binary coded signal uniquely indicative of the position of said target.

2. The device of claim 1 wherein said multifaceted lens means comprises a plurality of similar lens elements for focusing an image of the target at corresponding portions of each of said sensor units.

3. The device of claim 1 wherein one half of said sensor units include sensor elements having finger patterns running in a first direction, and the other half of said sensor units have sensor elements with finger patterns running in a direction normal to said first direction.

4. The device as in claim 1 wherein each of said sensor units comprises a conductive backing, a silicon wafer attached to said backing, and metallic layers deposited on said wafer to form said finger patterns.

5. The device of claim 4 and further including power source means for back biasing said wafer and a load resistor connected between said power source means and each of said sensor elements, a voltage being developed across each of said load resistors when the sensor element connected thereto has an image of the target focused thereon.

6. The device of claim 3 wherein said storage register means includes a first digital register for receiving the outputs of said one half of sensor units and a second digital register for receiving the outputs of said other half of said sensor units.

7. In an optical sensing system for detecting the position of a point source target,
   a plurality of sensor units, each of said sensor units comprising a photosensitive area divided equally between a pair of sensor elements,
   means for focusing an image of said target onto a corresponding portion of each of said sensor units, and
   digital storage register means for generating a binary coded signal in accordance with the outputs of said sensor units, said digital storage register means comprising a binary storage element connected to receive the sensor element outputs of each of said sensor units.

8. The system of claim 7 wherein said sensor elements are arranged in binary coded finger patterns, the elements of each pair being similar in configuration to each other.

9. The system as recited in claim 7 wherein said focusing means comprises a multifaceted lens.